(12) United States Patent
Ness

(10) Patent No.: US 10,479,847 B2
(45) Date of Patent: Nov. 19, 2019

(54) POLYMER-ENCAPSULATED PIGMENT PARTICLE

(71) Applicant: SWIMC LLC, Cleveland, OH (US)

(72) Inventor: Jason Ness, Woodbury, MN (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 15/614,026

(22) Filed: Jun. 5, 2017

(65) Prior Publication Data

US 2017/0267792 A1  Sep. 21, 2017

Related U.S. Application Data

(63) Continuation of application No. PCT/US2015/064000, filed on Dec. 4, 2015.

(60) Provisional application No. 62/089,012, filed on Dec. 8, 2014.

(51) Int. Cl.
| | |
|---|---|
| C08F 2/22 | (2006.01) |
| C08F 20/06 | (2006.01) |
| C09C 3/10 | (2006.01) |
| C09D 5/00 | (2006.01) |
| C09D 109/00 | (2006.01) |
| C08F 292/00 | (2006.01) |
| C09D 7/62 | (2018.01) |
| C09D 5/02 | (2006.01) |
| C09D 151/10 | (2006.01) |
| C08K 3/22 | (2006.01) |
| C08K 9/10 | (2006.01) |

(52) U.S. Cl.
CPC ............... *C08F 20/06* (2013.01); *C08F 2/22* (2013.01); *C08F 292/00* (2013.01); *C09C 3/10* (2013.01); *C09D 5/00* (2013.01); *C09D 5/02* (2013.01); *C09D 7/62* (2018.01); *C09D 109/00* (2013.01); *C08J 2335/00* (2013.01); *C08K 9/10* (2013.01); *C08K 2003/2241* (2013.01); *C09D 151/10* (2013.01)

(58) Field of Classification Search
CPC .......... C08F 20/06; C08F 2/22; C08F 292/00; C09C 3/10; C09D 5/00; C09D 7/62; C09D 5/02; C09D 109/00; C08K 9/10
USPC ........................................................ 523/200
See application file for complete search history.

(56) References Cited

U.S. PATENT DOCUMENTS

| | | | |
|---|---|---|---|
| 4,421,660 A | 12/1983 | Solc Nee Hajna | |
| 4,665,107 A | 5/1987 | Micale | |
| 4,713,411 A * | 12/1987 | Kanou | C08J 3/212 |
| | | | 524/560 |
| 5,171,772 A | 12/1992 | Hoy et al. | |
| 5,531,816 A | 7/1996 | Wickramanayake | |
| 5,543,219 A | 8/1996 | Elwakil | |
| 7,071,261 B2 | 7/2006 | Devonport et al. | |
| 7,160,953 B2 | 1/2007 | Bowers et al. | |
| 7,579,081 B2 | 8/2009 | Brown et al. | |
| 7,795,330 B2 | 9/2010 | Birmingham et al. | |
| 7,960,026 B2 | 6/2011 | Koller et al. | |
| 8,283,404 B2 | 10/2012 | Allen et al. | |
| 8,304,485 B2 | 11/2012 | Allen et al. | |
| 8,329,807 B2 * | 12/2012 | Yang | C08F 2/24 |
| | | | 524/501 |
| 9,284,467 B2 * | 3/2016 | Booth | C09C 1/36 |
| 9,598,594 B2 * | 3/2017 | Booth | C09C 1/36 |
| 2003/0101910 A1 * | 6/2003 | Godwin | B82Y 30/00 |
| | | | 106/499 |
| 2003/0232914 A1 | 12/2003 | Devonport et al. | |
| 2004/0197359 A1 | 10/2004 | Yamada et al. | |
| 2005/0282932 A1 * | 12/2005 | Takizawa | C08F 230/02 |
| | | | 523/160 |
| 2006/0260505 A1 | 11/2006 | Ham et al. | |
| 2007/0141247 A1 | 6/2007 | Hall et al. | |
| 2007/0196291 A1 | 8/2007 | Sakuta | |
| 2008/0002004 A1 | 1/2008 | O'Donnell et al. | |
| 2008/0026221 A1 | 1/2008 | Vincent et al. | |
| 2009/0253853 A1 | 10/2009 | Lin et al. | |
| 2010/0056668 A1 | 3/2010 | Brown et al. | |
| 2010/0298484 A1 | 11/2010 | Allen et al. | |
| 2011/0251304 A1 | 10/2011 | Brown | |
| 2012/0244346 A1 | 9/2012 | Moorlag et al. | |
| 2013/0085222 A1 | 4/2013 | Fasano et al. | |
| 2013/0087736 A1 | 4/2013 | Baker et al. | |

(Continued)

FOREIGN PATENT DOCUMENTS

| | | | |
|---|---|---|---|
| EP | 2161304 A1 | 3/2010 | |
| EP | 2343344 A1 | 7/2011 | |

(Continued)

OTHER PUBLICATIONS

Extended European Search Report for Application No. 14826975.6, dated Jan. 24, 2017, 10 pages.

(Continued)

*Primary Examiner* — Hannah J Pak

(74) *Attorney, Agent, or Firm* — Patterson Thuente Pedersen, P.A.

(57) ABSTRACT

A polymer-encapsulated pigment dispersion is prepared from a mixture of (a) a carrier; (b) pigment particles; and (c) a polymeric dispersing agent having a polymer backbone, and an alkali-swellable copolymer component. The dispersing agent may provide efficient pigment wetting and dispersion using relatively low and thus economical dispersant amounts, and subsequently enable formation of polymer-encapsulating pigment dispersions that, when used in coatings, provide good opacity and good hiding characteristics, especially in titanium dioxide-containing coating compositions.

23 Claims, No Drawings

(56) References Cited

U.S. PATENT DOCUMENTS

| | | | |
|---|---|---|---|
| 2014/0011943 A1 | 1/2014 | Bardman et al. | |
| 2014/0121305 A1 | 5/2014 | Brown et al. | |
| 2014/0335348 A1* | 11/2014 | Kitamura | C09D 5/22 |
| | | | 428/330 |
| 2015/0080521 A1* | 3/2015 | Korenkiewicz | C09C 1/3676 |
| | | | 524/523 |
| 2015/0272838 A1 | 10/2015 | Lee et al. | |
| 2016/0130450 A1* | 5/2016 | Ness | C09D 5/02 |
| | | | 524/521 |

FOREIGN PATENT DOCUMENTS

| | | |
|---|---|---|
| WO | WO-2010074865 A1 | 7/2010 |
| WO | WO-2012116025 A1 | 8/2012 |
| WO | WO-2014084657 A1 | 6/2014 |
| WO | WO-2015010016 A1 | 1/2015 |

OTHER PUBLICATIONS

Extended European Search Report for Application No. EP15867968, dated May 11, 2018, 9 pages.
International Search Report and Written Opinion for Application No. PCT/US2015/064000, dated Mar. 16, 2016, 10 pages.
International Preliminary Report on Patentability for Application No. PCT/US2015/064000, dated Jun. 22, 2017, 9 pages.
International Search Report and Written Opinion for Application No. PCT/US2014/047188, dated Nov. 7, 2014, 13 pages.
International Preliminary Report on Patentabilityfor Application No. PCT/US2014/047188, dated Jan. 28, 2016, 10 pages.

* cited by examiner

POLYMER-ENCAPSULATED PIGMENT PARTICLE

CROSS-REFERENCE TO RELATED APPLICATION(S)

This application is a continuation of International Application Serial No. PCT/US2015/064000, filed Dec. 4, 2015, which claims priority from U.S. Provisional Application Ser. No. 62/089,012, filed Dec. 8, 2014, each of which is incorporated herein by reference in its entirety.

FIELD

This invention relates to pigment wetting and dispersing agents, pigment grind dispersions, polymer-encapsulated pigment dispersions, and to pigmented paints and other coating compositions.

BACKGROUND

Titanium dioxide is a widely used but increasingly expensive pigment in paints and other coating compositions. In many paint formulations, titanium dioxide represents the single most expensive raw material. A number of techniques and ingredients have been suggested for reducing the amount of titanium dioxide in coating composition formulations while still providing acceptable light scattering or opacity. One such ingredient is EVOQUE™ Pre-Composite Polymer supplied by Dow Chemical Company. EVOQUE products are presently available in four grades (EVOQUE 1140, EVOQUE 1180, EXP-4340 and EXP-4463) that are said to have differing degrees of reactivity towards titanium dioxide. According to its supplier, EVOQUE pre-composite polymer "combines with $TiO_2$ to form a polymer-pigment composite which improves both the wet and dry hiding efficiency of the pigment." Paints or other coating compositions made from such a composite may attain a given degree of pigment hiding at a somewhat reduced titanium dioxide pigment level, or may attain a somewhat increased degree of pigment hiding at a given titanium dioxide pigment level. However, the potential savings in titanium dioxide raw material costs and the potential benefits in pigment hiding efficiency are offset by the EVOQUE product cost.

A variety of other polymers have been proposed for use with pigments, for example, as pigment dispersing agents. Synthesis of some of these polymers requires expensive starting monomers or complex synthetic schemes. In other instances the polymers have high viscosities, limited pigment dispersing capabilities or other drawbacks. In yet other instances, these dispersants are made by solution polymerization, requiring additional processing to remove solvent(s) prior to use.

From the foregoing, it will be appreciated that what remains needed in the art are improved pigment-containing coating compositions having even lower raw material cost, even greater pigment hiding efficiency, or both lower cost and greater efficiency. Such compositions and components and methods for their manufacture are disclosed and claimed herein.

SUMMARY OF THE INVENTION

The present description provides, in one aspect, a pigment grind dispersion comprising a mixture of a carrier, pigment particles, a polymeric dispersing agent having polymer backbone, and an alkali-swellable copolymer component.

The description provides, in a further aspect, a pigment-encapsulating polymer dispersion including a mixture of a carrier, pigment particles, the particles being at least partially encapsulated by at least one polymer layer, and a polymeric dispersing agent having a polymer backbone, and an alkali-swellable copolymer component.

The description provides, in yet another aspect, a method for making a pigment grind dispersion. The method includes steps of mixing a carrier, pigment particles, and a polymeric dispersing agent having a polymer backbone, and an alkali-swellable copolymer component.

The present description provides, in a further aspect, a method for making a pigment-encapsulating polymer dispersion. The method includes steps of forming a dispersion of a carrier, pigment particles, and a polymeric dispersing agent having a polymer backbone, and an alkali-swellable copolymer component. In an embodiment, this is followed by including in or adding to the dispersion one or more ethylenically unsaturated monomers and a free-radical initiator, and polymerizing the ethylenically unsaturated monomers to at least partially encapsulate the pigment particles with at least one polymer layer.

The present invention provides, in a further aspect, a coating composition that includes a dispersion of a carrier, pigment particles, the pigment particles being at least partially encapsulated by at least one polymer layer, and a polymeric dispersing agent having a polymer backbone, and an alkali-swellable copolymer component. In addition, the composition also includes one or both of a film-forming binder containing a polymer other than the encapsulating polymer, or one or more standard paint formulation additives.

The disclosed dispersions, methods and coating compositions may comprise, consist essentially of, or consist of the recited ingredients. In exemplary preferred embodiments, the carrier comprises water, the pigment particles comprise titanium dioxide particles, the polymer backbone comprises a vinyl chain-growth polymer, the alkali-swellable copolymer component comprises a polymer of one or more ethylenically unsaturated monomers, and the at least partially encapsulated pigment particles are self-coalescing at room temperature without requiring the presence of a film forming binder containing a polymer other than the chain-growth polymer. The disclosed polymeric dispersing agents may provide efficient pigment wetting and dispersion using relatively low and thus economical raw material amounts (for example, pigment, polymeric dispersing agent and chain growth polymer amounts). Preferred embodiments of the disclosed dispersions, methods and coating compositions desirably provide good pigment particle wetting, and improved pigment dispersion in the final dried film, especially in titanium dioxide-containing latex paints, where improved dispersion leads to improved pigment hiding efficiency.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, a coating composition that contains "a" carrier or "an" optional surfactant means that the coating composition may include "one or more" carriers and "one or more" optional surfactants.

The term "binder" when used in respect to a liquid coating composition means a film-forming natural or synthetic polymer suitable for use in such a composition (if need be, accompanied by a suitable coalescent).

The term "bulk polymer" means a polymer formed from a homogeneous reaction mixture made by dissolving a suitable initiator in one or more reactive monomers and not requiring the presence of a solvent to carry out polymerization.

The term "carrier" when used in respect to a pigment grind dispersion or coating composition means a volatile dispersant or other vehicle for the remaining components of the dispersion or composition.

The term "emulsion polymer" means a polymer formed from a heterogeneous reaction mixture initially in the form of an emulsion containing water, one or more monomers and an emulsifying agent (e.g., a surfactant).

The term "alkali-swellable," as used herein, refers to a polymer (or other-component) that is, in an alkaline medium, capable of incorporating water by osmosis insufficient amounts to cause swelling of the polymer. The alkali-swellable polymer may-also then either fully dissolve in water upon neutralization to form a homogeneous aqueous solution or only swell to such a degree that it remains dispersed in aqueous solution. The-term "alkali-swellable copolymer component" is used interchangeably with the term "alkali-swellable emulsion (ASE)."

Unless otherwise indicated, a reference to a "(meth) acrylate" compound (where "meth" is bracketed) is meant to include both acrylate and methacrylate compounds.

The term "film-forming" when used in reference to a water-insoluble polymer means that an aqueous dispersion of the polymer (if need be, accompanied by a suitable coalescent) can be formed, coated in a thin wet layer (e.g., of about 25 μm thickness, and if need be at a temperature above room temperature) on a suitable substrate or support, and dried or otherwise hardened, to form a substantially continuous coating over the substrate or support.

The term "contrast ratio" means a value determined by casting an approximately 51 μm (2 mil) dry thickness coating film over the white and black portions of a Leneta Co. Form 3B opacity drawdown chart (from BYK-Gardner USA), measuring L* as defined in the ASTM International Standards on Color and Appearance Measurement: 8th Edition, and dividing the L* value measured over the black portion by the L* value measured over the white portion.

The term "functional" when used with respect to an organic group in a monomer or polymer means a group enabling such monomer or polymer to participate in a chemical reaction, or to assist in suspending or dispersing pigment in a carrier.

The terms "group" and "moiety" are used to differentiate between chemical species that allow for substitution or that may be substituted and those that do not allow or may not be so substituted. Thus, when the term "group" is used to describe a chemical substituent, the described substituent includes the unsubstituted group and that group with O, N, Si, or S atoms, for example, in the chain (e.g., as in an alkoxy group) as well as that group with carbonyl or other conventional substituents. When the term "moiety" is used to describe a chemical compound or substituent, only an unsubstituted chemical material or substituent is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "alkyl group" encompasses the term "alkyl moiety", and the disclosure of any particular group is also intended to be an explicit disclosure of the corresponding moiety of that particular group.

The term "latex" when used in respect to a polymer means an emulsion of polymer particles in water in which the polymer is not itself capable of being dispersed in water; rather, a latex polymer requires a secondary emulsifying agent (e.g., a surfactant) to form the emulsion. The term is synonymous and used interchangeably with the term "aqueous polymer dispersion."

The term "low VOC" when used with respect to paints and other coating compositions means that the coating composition contains less than about 1 wt. percent volatile organic compounds, preferably less than about 0.5 wt. % volatile organic compounds, more preferably less than about 0.05 wt. % volatile organic compounds and most preferably less than about 0.005 wt. % volatile organic compounds based upon the total coating composition weight.

The term "monomer" means a material that can be reacted, as need be in the presence of a suitable initiator or comonomer, to form a polymer containing three or more repeating units derived from the monomer or comonomer.

The term "multistage" when used with respect to a latex means the latex polymer was made using discrete charges of two or more monomers or was made using a continuously varied charge of two or more monomers. Usually, a multistage latex will not exhibit a single Tg inflection point as measured using DSC. For example, a DSC curve for a multistage latex made using discrete charges of two or more monomers may exhibit two or more Tg inflection points. Also, a DSC curve for a multistage latex made using a continuously varied charge of two or more monomers may exhibit no Tg inflection points. By way of further explanation, a DSC curve for a single stage latex made using a single monomer charge or a non-varying charge of two or more monomers may exhibit only a single Tg inflection point. Occasionally when only one Tg inflection point is observed it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The term "pigment" when used in respect to a coating composition or pigment grind dispersion means a particulate material that imparts one or more of color (including white or black), or other visual or performance effects to the composition or dispersion. The term pigment includes, without limitation, extender pigments, opacifying pigments, tinting pigments, etc. As used herein, the term "extender pigment" or "filler" refers to an inert, usually colorless and semi-transparent pigment used in a coating composition to fortify and lower the total cost. An "opacifying pigment" refers to one or more pigments added to a paint composition to make it opaque. As used herein, "opaque" means that a dry film of the coating composition has a contrast ratio greater than 95% at a 51 μm (2 mil) dry film thickness. In general, an extender pigment is assumed to have a refractive index of less than about 1.8, whereas an opacifying pigment is assumed to have a refractive index of greater than about 1.8.

The term "pigment-encapsulating polymer dispersion", as used herein, refers to pigment particles at least partially encapsulated by a polymeric layer. The term is used interchangeably with "polymer-encapsulated pigment dispersion."

The terms "pigment volume concentration" or "PVC" when used in respect to a coating composition mean the total percentage of dried coating volume occupied by all pigment species in the coating. PVC may be calculated as the fraction: PVC=pigment volume/(pigment volume+non-pigment volume).

The term "polymer" includes both homopolymers and copolymers (viz., polymers of two or more different monomers) having two or more repeating units and a weight average molecular weight (Mw) of at least 500 as measured using gel permeation chromatography and a polystyrene standard.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

When used with respect to a component which may be found in a coating composition or pigment grind dispersion, the term "substantially free of" means containing less than about 1 weight percent of the component based on the coating composition or pigment grind dispersion weight.

The term "vinyl" when used with respect to a monomer means a site of ethylenic unsaturation (preferably, terminal ethylenic unsaturation) having the formula —CH═CH2—.

The term "waterborne" when used in respect to a coating composition or pigment grind dispersion means that the major carrier is water.

The term "solvent-borne" when used with respect to a pigment grind dispersion or coating composition means that the major carrier is a non-aqueous solvent or a mixture of non-aqueous solvents.

The term "water-dispersible" when used in respect to a polymer means that without requiring the use of a separate surfactant, the polymer is itself capable of being dispersed into water, or water can be added to the polymer to form an aqueous dispersion.

Such water-dispersible polymers may include nonionic or ionic functionality on the polymer to assist in rendering the polymer water-dispersible. For such polymers, external acids or bases are typically required for ionic stabilization, but not in all cases. For example, a water-soluble composition (i.e. a highly hydrophilic polymer composition or system) would not require such stabilization. However, these external acids are not secondary emulsifying agents (e.g., surfactants) such as are used to form a latex polymer emulsion.

The recitation of a numerical range using endpoints includes all numbers subsumed within that range (e.g., 1 to 5 includes 1, 1.5, 2, 2.75, 3, 3.80, 4, 5, etc.).

A variety of pigment particles may be employed in the disclosed dispersions, methods and coating compositions. The particles provide light scattering sites within a dried film of the disclosed coating compositions, and impart hiding or opacity to the dried film. The light scattering ability of the pigment is described in terms of its refractive index. Accordingly, in an aspect, pigment particles described herein have a broad range of refractive indices, from about 1.2 to about 2.7. Without limiting to theory, extender pigments will generally have refractive index of less than about 1.8, while opacifying pigments will have refractive index of greater than about 1.8.

Exemplary pigment particles include opacifying pigment particles such as treated or untreated inorganic pigments and mixtures thereof, for example metallic oxides including titanium dioxide, iron oxides of various colors (including black); other oxides including zinc oxide, antimony oxide, zirconium oxide, chromium oxide, and lead oxide; sulfates, sulfides and mixtures thereof including barium sulfate, zinc sulfide and lithopone; and metallic flakes such as aluminum flakes, pearlescent flakes, and the like. Representative pigments may have a variety of forms, for example rutile, anatase and Brookite forms in the case of titanium dioxide pigments. The pigment particles may have a variety of shapes and sizes but desirably will scatter photons having wavelengths in the spectral region from about 300 nm to about 1000 nm, such as the infrared region from about 700 to about 1000 nm, the visible spectral region from about 380 nm to about 700 nm, or portions or combinations thereof. Suitable pigment particle shapes include spherical shapes, such as a regular sphere, an oblate sphere, a prolate sphere, and an irregular sphere; cubic shapes such as a regular cube and a rhombus; plate-like shapes including a flat plate, a concave plate, and a convex plate; and irregular shapes. Particles having spherical shapes desirably have average diameters of about 5 nm to about 5,000 nm, e.g., about 10 nm to about 1,000 nm, about 100 nm to about 500 nm, about 200 nm to about 300 nm, or about 220 to about 280 nm. Particles having non-spherical shapes desirably have a maximum diameter of up to about 1 micrometer, e.g., up to about 500 nm or up to about 300 nm. The pigment particles may include one or more coatings or surface treatments, for example, inorganic or organic coatings or surface treatments such as silica, alumina, zirconia, hydrous titania, tin oxide, zinc oxide, cerium oxide, phosphate, nitrate, polyols, amines, amine salts, silicones, siloxanes and combinations thereof (for example, a silica coating and an alumina coating). The pigment particles may be uncoated and untreated, but may be sufficiently well encapsulated as disclosed herein so that the encapsulated pigment particles can be employed in exterior coatings while requiring reduced levels of UV absorbers, antioxidants or other weathering-resistant additives compared to coatings made from pigment particles that have not been so encapsulated. Suitable pigments are commercially available from a variety of suppliers including BASF, the LANXESS Inorganic Pigment Business Unit of Bayer Corp., Cabot Corp, Ciba Specialty Chemicals, Clariant, Ferro Corporation, Shepherd Color Company, Sun Chemical and Tomatec America, Inc. Titanium dioxide pigment particles are preferred and include those made by the chloride process, those made by the sulfide process, and those made in slurry or dry forms. Exemplary titanium dioxide pigments include KRONOS™ 1071, 2020, 2044, 2090, 2101, 2102, 2131, 2160, 2210, 2310, 4102, 4310 and 4311 from Kronos, Inc., TIONA™ 595 and 596i from Millennium Specialty Chemicals Inc. TIPURE™ TS-6200, R-706, R-741, R-746, R-900, R-902+, R-931 and R-960 from E. I. duPont de Nemours and Company, TRONOX™ CR-813, CR-813S, CR-826, CR-826S, CR-828, CR-834 and CR-880 from Tronox Corporation, and products from other suppliers including Bluestar New Chemical Materials Co., Ltd., Hebei Chuanghui Chemicals Co., Ltd., Henan Billions Chemicals Co., Ltd., Ishihara Sangyo Kaisha, Ltd., Nanjing Hengsiman Chemical Co., Ltd., Pangang Titanium Industry Co., Ltd., Qingdao Gracecorp Co., Ltd., Sakai Chemical Industry Co., Ltd., Shanghai Yuejiang Titanium Chemical Manufacturer Co., Ltd., Shijiazhuang Kelichuangxin Chemicals Co., Ltd. and Xuzhou Zhonglian Chemical Technology Co., Ltd. and mixtures thereof.

The disclosed pigment grind dispersions may also contain a variety of extender pigments or filler materials including talcs, china clay, barytes, carbonates, silicates and mixtures thereof. Exemplary such materials include magnesium silicates, calcium carbonate, aluminosilicates, silica and various clays.

If desired the disclosed pigment grind dispersions may include other pigments, including dyes, treated or untreated organic pigments, glasses and mixtures thereof. Exemplary such materials include various carbon blacks, azo pigments, benzimidazolinones, carbazoles such as carbazole violet, indanthrones, isoindolinones, isoindolons, perylenes, phthalocyanines, quinacridones, thioindigo reds, organic pigments including plastic pigments such as solid bead pigments (e.g., polystyrene or polyvinyl chloride beads), and microsphere pigments containing one or more voids and vesiculated polymer particles (e.g., those discussed in U.S. Pat. Nos. 4,427,835, 4,920,160, 4,594,363, 4,469,825, 4,468,498, 4,880,842, 4,985,064, 5,5157,084, 5,041,464, 5,036,109, 5,409,776, and 5,510,422). Other exemplary such materials include EXPANCEL™ 551DE20 acrylonitrile/vinyl chloride expanded particles (from Expancel Inc.), SIL-CEL™ 43 glass micro cellular fillers (from Silbrico Corporation), FILLITE™ 100 ceramic spherical particles (from Trelleborg Fillite Inc.), SPHERICEL™ hollow glass spheres (from Potter Industries Inc.), 3M ceramic microspheres including grades G-200, G-400, G-600, G-800, W-210, W-410, and W-610 (from 3M), 3M hollow microspheres including 3M Performance Additives iM30K (also from 3M), INHANCE™ UH 1900 polyethylene particles (from Fluoro-Seal Inc.), and BIPHOR aluminum phosphate (from Bunge Fertilizantes S.A., Brazil). The pigments are used in an amount sufficient to provide a suitably tinted, and if need be, suitably opaque cured coating composition at the desired coating thickness level, e.g., at pigment volume concentrations (PVC) of about 0.25 to about 95 volume percent. The pigment particles may improve the opacity or hiding of a coating composition formulated over a wide variety of desired PVC values. Preferably, the PVC of the disclosed coating compositions is from about 5 to about 85%, and more preferably from about 10 to about 60%.

The disclosed pigment grind dispersions may be made by blending together the disclosed pigment particles, polymeric dispersing agent, a carrier and an optional surfactant. Without intending to be bound by theory, the grind process may involve deagglomeration of pigment particles (induced for example by shear or other forces in the stirred pigment grind dispersion), and the polymeric dispersing agent may help wet out the newly-exposed pigment surface area, electrostatically (or otherwise) stabilize the deagglomerated particles, and prevent or discourage them from reagglomerating. The polymeric dispersing agent accordingly may promote more efficient pigment particle use and increase the extent to which such particles scatter light and opacify the disclosed coating compositions. The polymeric dispersing agent may for example be a bulk polymer, solution polymer or a water-dispersible polymer, or an aqueous polymer dispersion, and may for example be made by polymerizing a mixture of ethylenically unsaturated alkali-swellable monomer(s), and ethylenically unsaturated monomer(s) in a suitable carrier and in the presence of an initiator. The polymeric dispersing agent may for example represent at least about 0.1, at least about 0.2, at least about 0.3, or at least about 0.5 wt. %, and up to about 25, up to about 10, up to about 5, or up to about 2 wt. % of the opacifying pigment particle weight.

A variety of ethylenically unsaturated monomers may be used to form the alkali-swellable copolymer component of the disclosed polymeric dispersing agent. Suitable alkali-swellable polymers include, for example, those derived from one or more ethylenically unsaturated monomers, including, without limitation, methacrylic acid (MAA), crotonic acid, maleic acid, maleic anhydride, itaconic acid, cinnamic acid, fumaric acid, beta-carboxyl ethyl acrylate, mixtures and combinations thereof, and the like. In a preferred aspect, the alkali-swellable copolymer component may be derived from methacrylic acid.

In an embodiment, the disclosed polymeric dispersing agent may be formed from a variety of monomers, including hydrophobic or hydrophilic monomers. A variety of ethylenically unsaturated hydrophobic monomers may be used to form the disclosed polymeric dispersing agent. The ethylenically unsaturated hydrophobic monomers may include one or more (and preferably include one) ethylenically unsaturated groups, preferably a terminal vinyl group. The ethylenically unsaturated hydrophobic monomers also include one or more (and preferably include one) hydrophobic group, and preferably do not include hydrophilic groups. The hydrophobic groups provide hydrophobic polymer side chains in the polymeric dispersing agent. Exemplary hydrophobic groups include alkyl groups, aryl groups, fatty acid residues, fluorocarbon groups and silicone groups. Exemplary ethylenically unsaturated hydrophobic monomers include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, 2-ethyl hexyl (meth)acrylate, isodecyl (meth)acrylate, styrene, substituted styrenes (e.g., vinyltoluene, alpha-methyl styrene, para-methylstyrene, para-t-butylstyrene, and divinylbenzene), allyl compounds (e.g., diallyl phthalate and 2,4,6-triallyloxy-1,3,5-triazine), lauryl (meth)acrylate, stearyl (meth)acrylate, behenyl (meth)acrylate, trimethylcyclohexyl (meth)acrylate, cyclohexyl (meth)acrylate, t-butyl cyclohexyl (meth)acrylate, isobornyl (meth)acrylate, t-butyl cyclohexyl (meth)acrylate, phenyl (meth)acrylate, benzyl (meth)acrylate, the acrylate counterparts thereof and mixtures thereof. The ethylenically unsaturated hydrophobic monomer may for example represent preferably at least about 1 wt % to 99 wt %, more preferably 5 wt % to 95 wt %, even more preferably 10 wt % to 90 wt %, and most preferably 15 wt % to 85 wt % of the disclosed polymeric dispersing agent.

A variety of ethylenically unsaturated hydrophilic monomers may be used to form the disclosed polymeric dispersing agent. The ethylenically unsaturated hydrophilic monomers may include one or more (and preferably one) ethylenically unsaturated group, preferably a terminal vinyl group. The ethylenically unsaturated hydrophilic monomers also include one or more (and preferably one) hydrophilic group, for example, a hydroxyl group, an acidic group, amino group or ethylene oxide group. The hydrophilic groups provide hydrophilic polymer side chains in the polymeric dispersing agent, and may increase the polymeric dispersing agent water solubility, or may assist in wetting and stabilizing the dispersed pigment particles as discussed above. Exemplary acidic hydrophilic groups include carboxyl (e.g., —COOH), sulfonyl (e.g., —S(=O)OH) and organophosphorus (e.g., —P(═O)OH$_2$) groups as well as salts and esters thereof. Exemplary ethylenically unsaturated acidic monomers include acrylic acid, methacrylic acid, itaconic acid, 2-sulfoethyl (meth)acrylate, hydroxy ethyl (meth)acrylate, sulfopropyl (meth)acrylate, styrene sulfonic acid, vinyl sulfonic acid and the salts and esters thereof. Exemplary esters of unsaturated acidic monomers may be formed by reacting unsaturated acids with straight chain, cyclic or aromatic alcohols or polyols or their derivatives having 1 or more (e.g., 1 to 18) carbon atoms, or by reacting unsaturated alcohols with straight chain, cyclic or aromatic carboxylic acids or polyacids or their derivatives having 1 or more (e.g., 1 to 18) carbon atoms. Exemplary salts of unsaturated acidic monomers include alkali metal and ammonium salts. Exemplary amido groups include acrylamido (e.g., —C(═O)NH$_2$) groups. Exemplary ethylenically unsaturated amido monomers include 2-(meth)acrylamido-2-methyl propanesulfonic acid, (meth)acrylamide, methoxy (meth)acrylamide, methoxy methyl (meth)acrylamide and n-butoxy methyl (meth)acrylamide. Mixtures of ethylenically unsaturated hydrophilic monomers may also be employed. The ethylenically unsaturated hydrophilic monomer may for example represent preferably about 1 to about 99 wt. %, preferably 5 to 90 wt %, more preferably 10 to 70 wt %, and most preferably 25 to 65 wt % of the disclosed polymeric dispersing agent.

The polymeric dispersing agent may if desired be formed using appropriate amounts of other ethylenically unsaturated monomers, for example acrylonitriles, vinyl ethers and other monomers that will be familiar to persons having ordinary skill in the art. The disclosed polymeric dispersing agents may also be formed using monomers that do not provide polymeric side chains like those discussed above, provided that monomers containing precursor units that can be modified by postpolymerization reactions may be used to provide polymer side chains like those discussed above. Other postpolymerization reactions for providing other polymer side chain groups like those discussed above will be apparent to persons having ordinary skill in the art.

The polymeric dispersing agent may be formed in the presence of one or more optional chain-growth polymerization initiators (viz., catalysts). Exemplary initiators include hydroperoxide, persulfate, peroxy and azo derivatives, and other initiators that will be familiar to persons having ordinary skill in the art. Exemplary hydroperoxide initiators include, without limitation, cumene hydroperoxide, t-butyl hydroperoxide, hydrogen peroxide, and the like. Exemplary persulfate initiators include, without limitation, sodium persulfate, potassium persulfate, ammonium persulfate, and the like. Exemplary peroxy initiators include t-butyl peroxy-2-ethylhexanoate, di-t-butyl peroxide, di-cumyl peroxide, tertiary amyl peroxide, cumene hydroperoxide, di-n-propyl peroxydicarbonate, tertiary amyl peracetate, and the like. Exemplary azo initiators include 2,2-azobis(2-methylisobutyronitrile), 2,2-azobis(2-methylbutanenitrile), 2,2-azobis(2,4-dimethyl pentanenitrile), 2,2-azobis(2,4-dimethyl-4-ethoxyvaleronitrile) and the like.

The polymeric dispersing agent described herein may include one or more alkali-swellable emulsions (ASE) or alkali-swellable copolymer components. The alkali-swellable emulsion or alkali-swellable copolymer component of the polymeric dispersing agent may be prepared by copolymerizing ethylenically unsaturated monomers using techniques that will be familiar to persons having ordinary skill in the art. The amounts of each monomer may be adjusted to provide desired performance and other characteristics, with polymeric dispersing agents derived at least in part from one or more styrenes, acrylates or methacrylates being preferred. In a preferred aspect, the one or more alkali-swellable components are present in an amount of about 1% to 80%, preferably 10% to 70%, more preferably 25% to 65%, based on the total weight of the composition. The polymeric dispersing agent typically will be formed in (or may be combined with) one or more solvents or carriers. Exemplary solvents or carriers include water, esters such as ethyl acetate and butyl acetate; ketones such as methyl ethyl ketone, methyl isobutyl ketone, methyl n-amyl ketone, and acetone; alcohols such as methanol, ethanol, isopropanol, and butanol; glycols such as ethylene glycol and propylene glycol; ethers such as tetrahydrofuran, ethylene glycol monobutyl ether, and propylene glycol methyl ether; and mixed ether acetates such as propylene glycol methyl ether acetate, diethylene glycol monobutyl ether acetate, and the like. In an aspect, where the polymeric dispersing agent includes an aqueous polymer dispersion, or a water-soluble polymer dispersion, the carrier or solvent may be water. In some pigment grind dispersion embodiments (e.g., in some solvent-borne embodiments) the polymeric dispersing agent is a solution polymer with for example an acid number greater than about 2, greater than about 5, greater than about 10 or greater than about 20. In other pigment grind dispersion embodiments (e.g., in some waterborne embodiments) the polymeric dispersing agent is water-dispersible (as provided or via the addition of an appropriate neutralization agent) and may for example have an acid number of 0 or an acid number greater than about 20, greater than about 30, greater than about 50 or greater than about 100. The acid number may for example also be up to about 700, less than about 500 or less than about 300. Polymeric dispersing agents may also be prepared as solution polymers and then used in water-borne coating compositions by exchanging the polymerizing solvent for water after completion of solution polymerization so as to facilitate subsequent mixing of the polymeric dispersing agent and pigment particles in an aqueous carrier, or by separating the polymer from the polymerization solvent using techniques that will be familiar to those skilled in the art such as precipitating the polymer in a non-solvent and then re-dissolving the precipitate in an aqueous carrier.

In a preferred aspect, the polymeric dispersant is formed by copolymerizing one or more ethylenically unsaturated monomers, such as (meth)acrylic acid, for example, along with a chain transfer agent and optionally, additional monomers via emulsion polymerization to form an alkali-swellable emulsion (ASE).

The polymeric dispersing agent may have a variety of molecular weights. Preferably the molecular weight is sufficiently small so that the polymer will have low viscosity and good pigment wetting characteristics. The polymeric dispersing agent may for example have a weight average molecular weight (as measured using gel permeation chromatography and a polystyrene standard) that is greater than about 500, greater than about 2,000, greater than about 5,000 or greater than about 7,000. The weight average molecular weight may for example also be less than about 200,000, less than about 50,000, less than about 20,000, less than about 10,000 or less than about 8,000. Expressed on a weight basis, the pigment grind dispersion may for example contain about 5 to about 80 weight percent pigment, about 0.01 to about 10 weight percent polymeric dispersing agent, and about 10 to about 70 weight percent carrier. These amounts may however depend upon a variety of factors including the pigment type, density, surface area and oil absorption value.

The pigment particles and polymeric dispersing agent may be combined using techniques that will be familiar to persons having ordinary skill in the art. Preferably, they are combined in a carrier that will become an eventual carrier for the completed coating composition, in a mixture typically referred to as a "grind". The grind may if desired include grinding media and other components or ingredients that facilitate pigment size reduction and dispersion. The grind optionally may include one or more monomers that will be eventually be used to encapsulate the dispersed pigment particles, or such monomers may be added at after the pigment particles have been dispersed in the grind.

Once a suitable pigment particle size and degree of dispersion has been achieved, the pigment particles are next at least partially encapsulated by the disclosed polymer layer or layers. In an aspect, the polymer layer or layers may be a chain-growth polymer layer. In another aspect, the polymer layer or layers may be a step-growth polymer layer.

In an embodiment, where the polymer layer is a chain-growth polymer, the partial encapsulation may conveniently be performed by including in or adding to the pigment grind dispersion one or more ethylenically unsaturated monomers (such as the monomers discussed above) and an free-radical initiator (such as the initiators discussed above) and if need be additional carrier or a further carrier (such as the carriers discussed above) to form a pigment-encapsulating dispersion. Exemplary ethylenically unsaturated monomers for use in forming the chain-growth polymer layer or layers include styrene, acrylates and methacrylates such as, without limitation, styrene, substituted styrenes (e.g., vinyltoluene, alpha-methyl styrene, para-methyl styrene, para-t-butyl styrene, divinylbenzene, and the like), methyl methacrylate (MMA), ethyl methacrylate, 2-hydroxyethyl methacrylate (2-HEMA), methacryloxyethyl phosphate, sulfoethyl methacrylate, n-propyl methacrylate, isopropyl methacrylate, 2-hydroxypropyl methacrylate, n-butyl methacrylate, isobutyl methacrylate, t-butyl methacrylate, 4-hydroxylbutyl methacrylate, 2-ethyl hexyl methacrylate, isodecyl methacrylate, lauryl methacrylate, stearyl methacrylate, behenyl methacrylate, ethylene glycol dimethacrylate (EGDMA), trieththylene glycol dimethacrylate (TEGDMA), polypropylene glycol dimethacrylate (PPGDMA), dipropylene glycol dimethacrylate, 1,3- and 1,4-butanediol dimethacrylate, polyethylene glycol dimethacrylate (PEGDMA), 1,3-butylene glycol dimethacrylate, 1,6-hexane diol dimethacrylate (HDDMA), trimethylolpropane trimethacrylate (TMPTMA), tetramethylolpropane trimethacrylate, acetoacetoxyethyl methacrylate (AAEM), glycidyl methacrylate, trimethylcyclohexyl methacrylate, cyclohexyl methacrylate, t-butyl cyclohexyl methacrylate, isobornyl methacrylate, t-butyl cyclohexyl methacrylate, phenyl methacrylate, benzyl methacrylate, the acrylate counterparts thereof and mixtures thereof. Additional exemplary ethylenically unsaturated monomers include acrylamides and acrylonitriles such as methacrylamide, methoxy methacrylamide, methoxy methyl methacrylamide, n-butoxy methyl methacrylamide, methacrylonitrile, and the like. Preferably, the chain-growth polymer layer is a latex polymer (for example, a single stage or multistage latex polymer).

In an embodiment, where the polymer layer is a step-growth polymer, the partial encapsulation may conveniently be performed by including in or adding to the pigment grind dispersion one or more highly-functional reactive monomers or oligomers that can form a polymer by step-growth to provide a pigment-encapsulating dispersion. Exemplary polymers formed by step-growth as described herein include the reaction products of one or more dibasic acids such as carboxylic acids including, without limitation, succinic acid, adipic acid, sebacic acid, a dimer acid, maleic anhydride, phthalic anhydride, isophthalic acid, and terephthalic acid, and the like with one or more polyhydric alcohols (e.g., diols, triols, tetraols, etc.) such as, without limitation, ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentanediol, 2-butyl-2-ethyl-1,3-propanediol, 2,2-diethyl-1,3-propanediol, glycerin, trimethylolpropane, pentaerythritol, and the like. These polymers formed by step-growth may be further modified by reaction with one or more aromatic diisocyanates, aliphatic or alicyclic diisocyanates, polyisocyanates obtained therefrom, and the like.

In a preferred embodiment, the pigment particles and polymeric dispersing agent are combined in a two-step process as follows. First, an aqueous pigment dispersion or pigment slurry is formed by high speed mixing (i.e. grinding) of dry pigment and a copolymer dispersant in aqueous media. Second, emulsion polymerization takes place in the presence of the pigment dispersion to form an encapsulated pigment dispersion.

In an aspect, the copolymer dispersant used in the formation of the pigment dispersion is an alkali-swellable emulsion (ASE). Some ASEs are known to those of skill in the art as pigment dispersants. However, surprisingly and unexpectedly in view of conventional practice in the art, the ASEs used herein are found to produce a stable pigment dispersion or slurry that can subsequently also be used to produce an encapsulated pigment dispersion. Moreover, the ASEs used herein are simple to use and inexpensive to manufacture, this providing a significant advantage over other dispersants made by solution polymerization (and therefore requiring solvent removal prior to use), or dispersants made using expensive specialty monomers.

In a preferred embodiment, at least one polymer layer formed as described herein is a film-forming binder and the at least partially encapsulated pigment particles are self-coalescing at room temperature without requiring the presence of another film-forming binder and without requiring coalescing aids containing objectionable quantities of VOCs.

The layers may be formed using a variety of methods including those described in U.S. Pat. No. 5,171,772 (Hoy et al.). The polymer layer or layers may for example have a calculated thickness of about 10 to about 400 nm, with the desired spacing being somewhat dependent on the pigment particle size. For example, for titanium dioxide particles having a 250 nm average particle size, the encapsulating polymer layer desirably has a thickness of about 100 nm so as to maintain a spacing of at least about one-half the minimum wavelength of visible light (viz., at least about 200 nm) between titanium dioxide particles.

The resulting pigment-encapsulating dispersion may optionally be combined with one or more binders or one or more coating adjuvants (such as thickeners, rheology modifiers, surfactants or coalescents) to form a finished coating. Exemplary binders will be familiar to persons having ordinary skill in the art, and may be in a variety of forms including latex polymers and solution polymers, e.g., acrylic copolymers, styrene/acrylic copolymers, vinyl acetate copolymers, vinyl acetate/acrylic copolymers, vinyl versatic acid ester/acrylic copolymers, ethylene/vinyl acetate copolymers, styrene/butadiene copolymers, alkyds, polyesters, polyester urethanes, drying oil modified polymers such as drying oil modified polyesters and polyurethanes, polyethers, polyamides, epoxy esters, polyureas, polyurethanes, polysiloxanes, silicones, fluorinated copolymers such as vinylidene fluoride, and blends of any of the above polymeric binders. The binder may include a component or components of a multicomponent (e.g., two-component) reactive system such as a component of an isocyanate-polyamine, isocyanate-polyol, epoxy-polyamine, carbodiimide-polyacid, aziridine-polyacid, melamine-polyol, or urea formaldehyde-polyol coating system. The binder may for example represent about 5 to about 99 volume percent of the dried coating volume. The volume solids, as defined by the fractional volume of dry ingredients in an as-supplied coating composition, may for example represent about 5 to about 80 volume percent of the coating composition. The pigment volume concentration, as defined by the fractional volume of pigment in a dried coating, may for example represent about 0.1 to about 95 volume percent of the coating. In some embodiments, the pigment volume concentration desirably is about 0.1 to about 5 volume percent, about 0.5 to about 40 volume percent, or about 1 to about 25 volume percent. The glass transition temperature for the polymeric binder may for example be about −130 to about 350° C., preferably about −20 to about 150° C., and more preferably about −10 to about 100° C. The coating composition viscosity may for example be about 10 to 100,000 cps at 25° C. as measured using a BROOKFIELD™ viscometer and RTV Spindle No. 4 operated at 20 rpm.

The recited thickeners, rheology modifiers, surfactants and coalescents will be familiar to persons having ordinary skill in the art. Exemplary thickeners or rheology modifiers include sedimentation inhibitors, hydrophobic ethoxylated urethane resin (HEUR) thickeners, hydrophobically-modified, alkali-soluble or alkali-swellable emulsion (HASE) thickeners), cellulosic thickeners, polysaccharide thickeners and mixtures thereof. Exemplary commercially-available rheology modifiers include NATROSOL™ 250 and the AQUAFLOW™ series from Ashland, ATTAGEL™ 50 from BASF Corp., the CELLOSIZE™ series and UCAR POLYPHOBE™ T-900 and T-901 from Dow Chemical Co., BENTONE™ AD and BENTONE EW from Elementis Specialties, LATTICE™ NTC-61 from FMC Biopolymer and ACRYSOL™ RM-6, ACRYSOL RM-8, ACRYSOL RM-12W and ACRYSOL RM-2020NPR all from Rohm & Haas. When a thickener or rheology modifier is present, the disclosed coating compositions preferably contain about 0.1 to about 10 or about 0.5 to about 3 weight percent thickener or rheology modifier based on the final dry coating composition weight.

Exemplary surfactants include anionic, cationic, amphoteric and nonionic surfactants. Commercially-available surfactants or dispersants include the TAMOL™ series from Dow Chemical Co., nonyl and octyl phenol ethoxylates from Dow Chemical Co. (e.g., TRITON™ X-45, TRITON X-100, TRITON X-114, TRITON X-165, TRITON X-305 and TRITON X-405) and other suppliers (e.g., the T-DET N series from Harcros Chemicals), alkyl phenol ethoxylate (APE) replacements from Dow Chemical Co., Elementis Specialties, and others, various members of the SURFYNOL™ series from Air Products and Chemicals, (e.g., SURFYNOL 104, SURFYNOL 104A, SURFYNOL 104BC, SURFYNOL 104DPM, SURFYNOL 104E, SURFYNOL 104H, SURFYNOL 104PA, SURFYNOL 104PG50, SURFYNOL 104S, SURFYNOL 2502, SURFYNOL 420, SURFYNOL 440, SURFYNOL 465, SURFYNOL 485. SURFYNOL 485W, SURFYNOL 82, SURFYNOL CT-211, SURFYNOL CT-221, SURFYNOL OP-340, SURFYNOL PSA204, SURFYNOL PSA216, SURFYNOL PSA336, SURFYNOL SE and SURFYNOL SE-F), various fluorocarbon surfactants from 3M, E.I. DuPont de Nemours and Co. and other suppliers, and phosphate esters from Ashland, Rhodia and other suppliers. When a surfactant is present, the disclosed coating compositions preferably contain about 0.1 to about 10 weight percent and more preferably about 1 to about 3 weight percent surfactant based on the total composition weight.

Coalescents may assist in coalescing the encapsulated pigment particles or optional further film-forming polymer into a continuous film. Exemplary coalescents include benzoates such as alkyl benzoates, monobenzoates and dibenzoates; hexanoates such as OPTIFILM™ 400 tri(ethylene glycol) bis(2-ethylhexanoate) from Eastman Chemical Co.; dioctyl maleate; oleic acid propylene glycol esters such as EDENOL™ EFC-100 from Cognis having the formula $HOCH(CH_3)CH_2OC(O)(CH_2(CH=CH(CH_2)_7CH_3)$;
UCAR Filmer IBT, UCAR n-propyl propionate, UCAR n-butyl propionate and UCAR n-pentyl propionate from DOW Chemical Co.; and TEXANOL™ ester alcohol from Eastman Chemical Co.; materials discussed in U.S. Pat. Nos. 6,762,230 B2, 7,812,079 B2 and 8,110,624 B2 (collectively, Brandenburger et al.) and in U.S. Pat. No. 8,106,239 B2 (Zhou et al.) and U.S. Pat. No. 8,394,496 B2 (Foster et al.), in U.S. Published Patent Application No. US 2009/0149591 A1 (Yang et al.); mixtures thereof and the like. Other coalescents that may be added to water-borne embodiments include VOCs including glycol ethers, organic esters, aromatic compounds, and ethylene or propylene glycols. When a coalescent is present, the disclosed coating compositions preferably contain about 0.05 to about 10 or about 0.05 to about 5 weight percent coalescent based on the final coating composition weight.

The disclosed coating compositions may contain a variety of other adjuvants that will be familiar to persons having ordinary skill in the art. Representative adjuvants are described in Koleske et al., Paint and Coatings Industry, April, 2003, pages 12-86. Exemplary adjuvants and commercial examples of the same include adhesion promoters; anti-cratering agents; antioxidants; biocides, fungicides, mildewcides and preservatives (e.g., BUSAN™ 1292 from Buckman Laboratories, Inc., NOPCOCIDE™ N-40D from Cognis, KATHON™ LX from Rohm & Haas, and POLYPHASE™ 663, POLYPHASE 678 and POLYPHASE PW-40 from Troy Corporation); buffers; curing indicators; defoamers; heat stabilizers; humectants; leveling agents; light stabilizers (e.g., hindered amine light stabilizers such as TINUVIN™ 123-DW and TINUVIN 292 HP from Ciba Specialty Chemicals); neutralizers; optical brighteners; pearlescents; plasticizers; polymeric additives; reactive diluents; tackifiers; ultraviolet light absorbers (e.g., TINUVIN 234 and TINUVIN 1130 from Ciba Specialty Chemicals); waxes (e.g., AQUACER™ 593 from Altana, HYDROCER™ 303 from Shamrock Technologies, Inc. and MICHEM™ Emulsion 32535 from Michelman, Inc.); wetting agents (e.g., BYK™ 346 and BYK 348 from Altana, PENTEX™ 99 from Rhodia and TROYSOL LAC™ from Troy corporation); and the like. The types and amounts of these and other adjuvants typically will be empirically selected.

The pigment-encapsulating dispersions preferably are universal dispersions whose vehicles and other ingredients render them suitable for use in solvent-borne and waterborne coating compositions. The pigment-encapsulating dispersions may be used to form or may be added to a variety of coating compositions including primers, primer surfacers, topcoats (including monocoats), and basecoats for clearcoat/basecoat finishes. These coating compositions may contain crosslinking agents including blocked isocyanates, alkylated melamines, polyisocyanates, epoxy resins, and the like, and may be solvent-borne or water-borne. A variety of vehicles or carriers may be employed in solvent-borne or water-borne embodiments. Exemplary solvents and carriers include those mentioned above. The disclosed coating compositions preferably are low VOC dispersions containing 0.01 to less than 5 weight percent VOCs, more preferably 0.01 to less than 2.5 weight percent VOCs, and most preferably 0.01 to less than 0.5 weight percent VOCs based upon the total liquid composition weight.

The disclosed coatings may be applied to a variety of substrates. Exemplary substrates include cement, cement fiberboard, concrete, metal, plastic and wood (including monolithic, engineered and veneered wood). The dried or hardened paints and stains may be evaluated using a variety of measurements including adhesion (as measured for example using ASTM D3359-07), block resistance (as measured for example using ASTM D4946-89, Reapproved 2003), chalking (as measured for example using ASTM D4214-07), cracking (as measured for example using ASTM D661-93), contrast ratio (CR, measured as described above), dirt retention (as measured for example using ASTM D3719-00), fading or color change (as measured for example using ASTM D2244-11), gloss or loss of gloss (as measured for example using ASTM D523-08), impact resistance (as measured for example using ASTM D2794-93, Reapproved 2010), low temperature coalescence (LTC, as measured for example using ASTM D3793-06), pendulum hardness (as measured for example using ASTM D-4366-95), scrub test (as measured for example using ASTM D2486-06), practical washability (as measured for example using ASTM D4828-94), tint strength (TS, as measured for example using ASTM D-2066-07), water resistance (as measured for example using ASTM D870-09) or collected measurement standards (for example those set forth in ASTM D3730-10 and ASTM D5324-10).

The invention is further described in the following Examples, in which all parts and percentages are by weight unless otherwise indicated.

Abbreviations

BA n-butyl acrylate
MMA methyl methacrylate
MAA methacrylic acid
APS ammonium persulfate
NVM non-volatiles by mass (percent solids)
tBHP t-butyl hydroperoxide (70% aq.)
FF6 BRUGGOLITE™ FF6 (from Bruggemann Chemical)

Example 1a

Alkali-Swellable Latex Copolymer Dispersant Preparation

A 3-liter kettle equipped with agitator, condenser and thermocouple was charged with 481.0 g deionized water, 17.7 g AEROSOL® A-103 and heated to 85° C. Separately, a monomer emulsion was prepared with 198.3 g deionized water, 4.4 g AEROSOL® A-103, 170.4 g MMA, 122.4 g MAA and 7.5 g n-dodecyl mercaptan. Once at 85° C., 0.7 g APS dissolved in 10.0 g deionized water was added to the kettle. After a 3 minute hold the monomer emulsion was fed semi-continuously over a period of 60 minutes. After completion of the monomer emulsion feed, the latex was held at 85° C. for an additional 30 minutes before cooling to ~60° C. at which time a chaser package of tBHP/FF6 was added to the reactor batch-wise and held for 30 minutes. The final latex had a pH=3.6, NVM=30.2% and a particle size=71.1 nm.

Example 1b

Alkali-Swellable Latex Copolymer Dispersant Preparation

A 3-liter kettle equipped with agitator, condenser and thermocouple was charged with 491.0 g deionized water, 17.7 g AEROSOL® A-103 and heated to 85° C. Separately, a monomer emulsion was prepared with 203.1 g deionized water, 4.4 g AEROSOL® A-103, 174.6 g MMA, 125.4 g MAA and 7.5 g n-dodecyl mercaptan. Once at 85° C., 0.7 g APS dissolved in 10.0 g deionized water was added to the kettle. After a 3 minute hold the monomer emulsion was fed semi-continuously over a period of 60 minutes. After completion of the monomer emulsion feed, the latex was held at 85° C. for an additional 30 minutes before cooling to ~60° C. at which time a chaser package of tBHP/FF6 was added to the reactor batch-wise and held for 30 minutes. The final latex had a pH=4.0, NVM=30.0% and a particle size=61.4 nm.

Example 2a $TiO_2$ Dispersion Preparation

A $TiO_2$ grind was prepared by first forming an aqueous solution comprising 333.3 g water and 91.7 g of the dispersant latex from Example 1a. The pH was raised to 9.0 using ammonia and 1100.0 g KRONOS® 2310 $TiO_2$ was gradually added over 5 minutes under moderate agitation before stirring at high speed for 30 minutes to yield a 73% NVM $TiO_2$ slurry containing 72.1 wt. % $TiO_2$ and 0.9 wt. % alkali-swellable latex copolymer dispersant.

Example 2b $TiO_2$ Dispersion Preparation

A $TiO_2$ grind was prepared by first forming an aqueous solution comprising 225.1 g water and 26.0 g of the dispersant latex from Example 1b. The pH was raised to 7.0 using ammonia and 650.0 g KRONOS® 2310 $TiO_2$ was gradually added over 5 minutes under moderate agitation before stirring at high speed for 30 minutes to yield a 73% NVM $TiO_2$ slurry containing 72.1 wt. % $TiO_2$ and 0.9 wt. % alkali-swellable latex copolymer dispersant.

Example 2c $TiO_2$ Dispersion Preparation
A $TiO_2$ grind was prepared by first forming an aqueous solution comprising 225.1 g water and 26.0 g of the dispersant latex from Example 1b. The pH was raised to 7.0 using ammonia and 650.0 g Ti-Pure™ R-706 $TiO_2$ was gradually added over 5 minutes under moderate agitation before stirring at high speed for 30 minutes to yield a TiO$_2$ slurry containing 72.1 wt % TiO$_2$ and 0.9 wt % alkali-swellable latex copolymer dispersant.

Example 3

One Stage Encapsulated TiO$_2$ Latex Formation 612.0 g of the TiO$_2$ dispersion from Example 2a was transferred to a 2-liter kettle equipped with agitator, condenser and thermocouple and diluted with 221.0 g of deionized water under agitation. Next 10.6 g RHODACAL® DS-4 was added to the kettle which was then heated to 50° C. Once at 50° C., 0.1 g of iron catalyst complex was added to the kettle and a monomer emulsion of 117.9 g deionized water, 21.3 g RHODACAL® DS-4, 257.9 g BA, 177.9 g MMA and 8.9 g MAA was fed over 270 minutes. Redox initiator solutions were fed concurrent with the duration of the monomer emulsion feed (1.0 g tBHP and 1.0 FF6 dissolved in 35 g deionized water each). After conclusion of the monomer emulsion and redox feeds, a chaser package of tBHP/FF6 was added to the reactor batch-wise and held for 30 minutes. Following this the latex was neutralized with aqueous ammonium hydroxide and biocide (Proxel™ AQ) was added. The final encapsulated TiO$_2$ latex had a pH=8.0, NVM=59.6%, particle size=469 nm and 0.07 wt. % grit.

Example 4

Two Stage Encapsulated TiO$_2$ Latex Formation 612.3 g of the TiO$_2$ dispersion from Example 2a was transferred to a 2-liter kettle equipped with agitator, condenser and thermocouple and diluted with 221 g of deionized water under agitation. Next 10.6 g RHODACAL® DS-4 was added to the kettle which was then heated to 50° C. Once at 50° C., 0.1 g of iron catalyst complex was added to the kettle and a first monomer emulsion of 23.6 g deionized water, 4.3 g RHODACAL® DS-4, 51.6 g BA, 35.6 g MMA and 1.8 g MAA was fed over 70 minutes. Immediately after completion of this first monomer emulsion feed a second monomer emulsion feed of 97.5 g deionized water, 12.4 g RHODACAL® DS-4, 206.3 g BA, 145.9 g MMA and 3.6 g MAA was fed over 120 minutes. Redox initiator solutions were fed concurrent with both monomer emulsion feeds over 190 minutes (1.0 g tBHP and 1.0 FF6 dissolved in 35 g deionized water each). After conclusion of the second monomer emulsion and redox feeds, a chaser package of tBHP/FF6 was added to the reactor batch-wise and held for 30 minutes. Following this the latex was neutralized with aqueous ammonium hydroxide and biocide (Proxel™ AQ) was added. The final encapsulated TiO$_2$ latex had a pH=8.4, NVM=59.0%, particle size=429 nm and 0.19 wt. % grit.

Example 5

Two Stage Encapsulated TiO$_2$ Latex Formation 612.0 g of the TiO$_2$ dispersion from Example 2b was transferred to a 2-liter kettle equipped with agitator, condenser and thermocouple and diluted with 221 g of deionized water under agitation. Next 9.7 g RHODACAL® DS-4 was added to the kettle and a nitrogen sparge was introduced. The kettle was kept at room temperature (22° C.). 0.1 g of iron catalyst complex was added to the kettle and a first monomer emulsion of 24.6 g deionized water, 2.7 g RHODACAL® DS-4, 44.4 g BA, 42.6 g MMA and 1.8 g MAA was fed over 70 minutes. Immediately after completion of this first monomer emulsion feed a second monomer emulsion feed of 99.7 g deionized water, 9.0 g RHODACAL® DS-4, 195.3 g BA, 156.2 g MMA and 3.6 g MAA was fed over 120 minutes. Redox initiator solutions were fed concurrent with both monomer emulsion feeds over 190 minutes (1.3 g tBHP and 1.0 FF6 dissolved in 35 g deionized water each). After conclusion of the second monomer emulsion and redox feeds, a chaser package of tBHP/FF6 was added to the reactor batch-wise and held for 30 minutes. Following this the latex was neutralized with aqueous ammonium hydroxide and biocide (Proxel™ AQ) was added. The final encapsulated TiO$_2$ latex had a pH=8.6 NVM=58.6%, particle size=388 nm and 0.07 wt. % grit.

Example 6

Two Stage Encapsulated TiO$_2$ Latex Formation 612.0 g of the TiO$_2$ dispersion from Example 2c was transferred to a 2-liter kettle equipped with agitator, condenser and thermocouple and diluted with 221 g of deionized water under agitation. Next 9.7 g RHODACAL® DS-4 was added to the kettle and a nitrogen sparge was introduced. The kettle was kept at room temperature (~22° C.). 0.1 g of iron catalyst complex was added to the kettle and a first monomer emulsion of 24.6 g deionized water, 2.7 g RHODACAL® DS-4, 44.4 g BA, 42.6 g MMA and 1.8 g MAA was fed over 70 minutes. Immediately after completion of this first monomer emulsion feed a second monomer emulsion feed of 99.7 g deionized water, 9.0 g RHODACAL® DS-4, 195.3 g BA, 156.2 g MMA and 3.6 g MAA was fed over 120 minutes. Redox initiator solutions were fed concurrent with both monomer emulsion feeds over 190 minutes (1.3 g tBHP and 1.0 FF6 dissolved in 35 g deionized water each). After conclusion of the second monomer emulsion and redox feeds, a chaser package of tBHP/FF6 was added to the reactor batch-wise and held for 30 minutes. Following this the latex was neutralized with aqueous ammonium hydroxide and biocide (Proxel™ AQ) was added. The final encapsulated TiO$_2$ latex had a pH=8.3 NVM=58.5%, particle size=401 nm and 0.11 wt. % grit.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

I claim:
1. A pigment grind dispersion comprising a mixture of:
a) a carrier comprising water;
b) opacifying inorganic pigment particles having an index of refraction of at least 1.8 and being at least partially encapsulated by at least one polymer layer;
c) alkali; and
d) a polymeric dispersing agent having one or more alkali-swollen or alkali-dissolved copolymer components, wherein the alkali-swollen or alkali-dissolved component is derived from ingredients including one or more ethylenically unsaturated hydrophilic monomers that include a hydroxyl group, acidic group, amino group or ethylene oxide group, and the polymeric dispersing agent is present at about 0.1 to about 25 wt. % of the opacifying pigment particle weight.

2. A method for making a polymer-encapsulated pigment dispersion, which method comprises:
 a) forming a dispersion of a carrier comprising water; opacifying inorganic pigment particles having an index of refraction of at least 1.8; alkali; and a polymeric dispersing agent having one or more alkali-swollen or alkali-dissolved copolymer components, wherein the alkali-swollen or alkali-dissolved component is derived from ingredients including one or more ethylenically unsaturated hydrophilic monomers that include a hydroxyl group, acidic group, amino group or ethylene oxide group, and the polymeric dispersing agent is present at about 0.1 to about 25 wt. % of the opacifying pigment particle weight;
 b) including in or adding to the dispersion one or more ethylenically unsaturated monomers and a free-radical initiator; and
 c) polymerizing the ethylenically unsaturated monomers to at least partially encapsulate the pigment particles with at least one polymer layer.

3. A coating composition comprising a dispersion of:
 a) a carrier comprising water;
 b) opacifying inorganic pigment particles having an index of refraction of at least 1.8, the pigment particles being at least partially encapsulated by at least one polymer layer;
 c) alkali;
 d) a polymeric dispersing agent having one or more alkali-swollen or alkali-dissolved copolymer components, wherein the alkali-swollen or alkali-dissolved component is derived from ingredients including one or more ethylenically unsaturated hydrophilic monomers that include a hydroxyl group, acidic group, amino group or ethylene oxide group, and the polymeric dispersing agent is present at about 0.1 to about 25 wt. % of the opacifying pigment particle weight; and
 e) one or both of:
   i) a film-forming binder containing a polymer other than the polymer layer polymer; or
   ii) one or more thickeners, rheology modifiers, surfactants or coalescents.

4. The dispersion of claim 1, wherein the alkali-swollen or alkali-dissolved component comprises an emulsion derived from ingredients including the one or more ethylenically unsaturated hydrophilic monomers.

5. The dispersion of claim 4, wherein the one or more ethylenically unsaturated hydrophilic monomers include (meth)acrylic acid.

6. The coating composition of claim 3, wherein the alkali-swollen or alkali-dissolved component is present in an amount of 5% to 90%, based on the total weight of the composition.

7. The dispersion of claim 1, further comprising extender pigment particles having a refractive index of less than about 1.8.

8. The coating composition of claim 3, wherein the one or more ethylenically unsaturated hydrophilic monomers include methacrylic acid.

9. The dispersion of claim 1, wherein the one or more ethylenically unsaturated hydrophilic monomers provide hydrophilic polymer side chains in the polymeric dispersing agent.

10. The dispersion of claim 9, wherein the hydrophilic polymer side chains increase water solubility of the polymeric dispersing agent.

11. The dispersion of claim 9, wherein the hydrophilic polymer side chains assist in wetting and stabilizing dispersed pigment particles.

12. The dispersion of claim 9, wherein the hydrophilic polymer side chains comprise acidic groups.

13. The dispersion of claim 12, wherein the acidic groups comprise carboxyl, sulfonyl or organophosphorus groups or a salt or ester thereof.

14. The dispersion of claim 8, wherein the emulsion was also derived from one or more ethylenically unsaturated hydrophobic monomers that include one or more hydrophobic groups that provide hydrophobic polymer side chains in the polymeric dispersing agent.

15. The dispersion of claim 1, wherein the alkali-swollen or alkali-dissolved component comprises an emulsion derived from ingredients including one or more of acrylic acid, itaconic acid, 2-sulfoethyl (meth)acrylate, hydroxy ethyl (meth)acrylate, sulfopropyl (meth)acrylate, styrene sulfonic acid, vinyl sulfonic acid and salts and esters thereof.

16. The dispersion of claim 1, wherein the alkali-swollen or alkali-dissolved component comprises an emulsion derived from ingredients including one or more of crotonic acid, maleic acid, maleic anhydride, itaconic acid, cinnamic acid, fumaric acid, beta-carboxyl ethyl acrylate, or a mixture or combination thereof.

17. The dispersion of claim 1, wherein the one or more ethylenically unsaturated hydrophilic monomers include methacrylic acid.

18. The dispersion of claim 1, wherein the copolymer components are swollen to such a degree that they remain dispersed in aqueous solution.

19. The dispersion of claim 1, wherein the copolymer components are fully dissolved to form a homogenous aqueous solution.

20. The dispersion of claim 1, wherein the copolymer components are swollen or dissolved by raising pH of the dispersion so that it provides an alkaline medium for the copolymer components.

21. The dispersion of claim 19, wherein the copolymer components are swollen or dissolved by raising the pH to 7 to 9.

22. The dispersion of claim 1, wherein the copolymer components are swollen or dissolved using ammonia.

23. The dispersion of claim 1, wherein the dispersion is neutralized using ammonium hydroxide.

* * * * *